UNITED STATES PATENT OFFICE 2,441,068

MANUFACTURE OF POLYMERIC SUBSTANCES CONTAINING FATTY OIL ACID RADICALS

Donald Helmsley Hewitt and Frank Armitage, Homerton, London, England

No Drawing. Application March 23, 1944, Serial No. 527,820. In Great Britain March 25, 1943

4 Claims. (Cl. 260—23)

This invention is for improvements in or relating to the manufacture of polymeric substances containing fatty oil acid radicals.

It has already been proposed in prior British specification No. 461,979 to manufacture the monomeric methacrylic acid esters of polyhydric aliphatic alcohols by reacting a lower alkyl ester of methacrylic acid with a polyhydric aliphatic alcohol or an alkali metal alcoholate thereof, if desired in the presence of a suitable ester interchange catalyst and/or in the presence of an inert solvent and preferably in the presence of an anti-polymerisation catalyst.

Similarly it has been proposed in U. S. Patent No. 2,160,532 to prepare a monomeric mixed ester of a polyhydric alcohol with a plurality of monocarboxylic acids, one of which is a monomeric alpha-methylene carboxylic acid and the remainder of which preferably comprise fatty oil acids.

Furthermore British specification No. 506,666 relates to a process for the manufacture of polymerisable oils which comprises reacting methacrylic anhydride with a polyhydric alcohol which is partially esterified with a polycarboxylic acid and partly with a fatty oil acid or a natural resin acid, but which still contains some unesterified hydroxyl groups.

These processes are all similar in that they relate to the preparation of substantially monomeric materials which may, however, be subsequently polymerised. In most cases reaction is preferably carried out in solution in the presence of polymerisation inhibitors and suitable catalysts which have subsequently to be removed by washing operations. In general, these reactions, owing to the low temperatures at which they are carried out, need a long time for their substantial completion. The products moreover are not, in general, of great use when polymerised alone, but can be polymerised with other polymerisable substances to produce co-polymers of greater value.

On the other hand it has been proposed in U. S. Patent No. 2,109,877 to subject a polymeric ester of an alpha-methylene mono-carboxylic acid to partial alcoholysis with an alcohol preferably having a higher boiling point than the alcohol whose radical forms part of the said ester. In the practice of the invention as disclosed in that patent, a solution of the polymeric ester is heated with an alcohol other than that forming the ester, preferably, but not necessarily, in the presence of a suitable ester inter-change catalyst. It is also stated in that patent that there may be used, in the ester inter-change process, any alcohol other than that to be displaced from the polymer and that polyhydric alcohols may be used though with difficulty. No example of the use of such alcohols or of their partial fatty acid esters is given. Here again it is to be noted that the reaction is carried out preferably in the presence of a solvent.

According to the present invention, a process for the production of polymeric substances containing fatty oil acid radicals comprises heating a polymeric acrylic ester of the class consisting of acrylic and methacrylic esters with a drying oil fatty acid partial ester of a polyhydric alcohol to a temperature within the range of 400 to 600° F. until partial alcoholysis has taken place, said partial ester containing at least 1 free hydroxyl group but less than that number of hydroxyl groups which will result in gelation prior to the attainment of homogeneity.

The said partial ester may contain the radicals of more than one non-hydroxylated fatty oil acid and the reaction is carried out preferably in the presence of an alcoholysis catalyst.

The number of free hydroxyl groups in the partial ester must be regulated in accordance with the molecular weight of the polymeric acrylic ester, that is to say, that with polymeric acrylic esters of a high molecular weight, there must not be more than one free hydroxyl group in each molecule of the partial ester whereas with the polymeric esters of lower molecular weight, more than one free hydroxyl group may be present in the partial ester molecule. The number of free hydroxyl groups which can be present in the said partial ester can be readily determined by test, the criterion being whether or not gelation of the product occurs before homogeneity is obtained.

The progress of the reaction is to some extent also determined by the molecular weight of the polymeric acrylic ester and an increase in the molecular weight is usually accompanied by a less smooth reaction due to increasing physical and chemical difficulties. The relative proportions of the polymeric and partial esters is also to some extent determined by the molecular weight of the polymeric acrylic ester since it is found that more of the lower molecular weight polymeric esters can be reacted with a given quantity of the partial ester than is the case with the higher molecular weight polymeric esters.

The various factors referred to above can always be selected to produce the desired result as a result of carrying out simple tests.

The said partial ester of a polyhydric alcohol is preferably obtained by an ester inter-change reaction between a drying oil and a polyhydric alcohol in the presence of an alcoholysis catalyst, for example, litharge, zinc oxide or calcium oxide. These latter substances become homogeneous with and remain in the reaction mixture serving to catalyse the subsequent reaction between the partial glycerides thus formed and the polymeric ester. They remain compatible with the final reaction product and have no deleterious effect on it. Therefore, the necessity for removing them by washing or other means does not arise. The first-mentioned substance is indeed particularly useful when the product of the invention is used to form the basis of a paint, varnish or like composition, since it remains in the composition and acts to speed up the rate of final hardening thereof.

The reaction can be carried out either in the presence or absence of a solvent; certain advantages arise from the absence of a solvent during the reaction, namely the temperature of reaction can be higher than would otherwise be the case (unless an autoclave were used, with its attendant disadvantages) and the time of reaction is thereby correspondingly reduced.

The nature of the final product can be varied by starting with polymers of the acrylic ester of differing degrees of polymerisation ranging from viscous liquids to hard solids; the length of the polymer chain does not appear to be substantially altered by the process of this invention but the alcohols esterifying the acrylic radicals are partly substituted by the partial ester of the polyhydric alcohol.

The invention also includes the valuable products obtained by the process of this invention and paints, varnishes and like compositions embodying the said products.

In one embodiment of this invention, the partial polyhydric alcohol esters of non-hydroxylated fatty oil acids are first prepared by the partial alcoholysis of the corresponding fatty glycerides or by the partial esterification of the polyhydric alcohol with non-hydroxylated fatty oil acids, in either case, in the presence of a suitable catalyst which is compatible with the final product to be obtained. The partial ester so obtained is then heated with a polymer of an acrylic acid ester in the presence of a catalyst for the alcoholysis recation to a temperature within the range of 400°–600° F. and is maintained at that temperature for a period of not more than 12 hours until the reaction product is homogeneous when cold and still soluble in the usual solvents.

The following example illustrates the manner in which the invention may be carried into effect, the proportions of reactants being given in parts by weight.

Technical diglycerides of linseed oil were prepared by heating 878 parts of alkali-refined linseed oil with 50 parts glycerine and 1.8 parts calcium linoleate at 500° F. for 1 hour. A stream of carbon dioxide gas served to agitate the liquid and an air-cooled condenser associated with the reaction vessel prevented escape of glycerine.

270 parts of the above diglycerides were mixed, in the cold, with 170 parts of polymethylmethacrylate (prepared by refluxing 300 gms. of the monomer, dissolved in 1200 gms. of butyl acetate containing 7.4 gms. of benzoyl peroxide, for a period of 18 hours and thereafter removing the solvent in vacuo) and a further 3 parts of calcium linoleate; the whole mass was then heated to a temperature of 520° F. and maintained at that temperature for 4 hours during which time the mixture was vigorously stirred. On cooling, a very stiff homogeneous balsam resulted. This was soluble in xylol and a film poured from the xylol solution was dry to the touch in ¼ hour without the addition of driers.

What we claim is:

1. A process for the production of a polymeric substance containing a drying oil fatty acid radical and capable of drying by oxidation under atmospheric conditions which comprises heating polymethyl methacrylate with a drying oil diglyceride in the presence of an alcoholysis catalyst to a temperature within the range of 400–600° F. until partial alcoholysis has taken place.

2. A process for the production of a polymeric substance containing a drying oil fatty acid radical and capable of drying by oxidation under atmospheric conditions which comprises heating polymethyl methacrylate with a drying oil diglyceride containing a single free hydroxyl group at a temperature between 400° and 600° F. for a period not in excess of 12 hours in the presence of litharge as an alcoholysis catalyst until partial alcoholysis has taken place.

3. A process for the production of a polymeric substance containing a linseed oil fatty acid radical and capable of drying by oxidation under atmospheric conditions which comprises heating polymethyl methacrylate with a linseed oil diglyceride containing a single free hydroxyl group at a temperature between 400° and 600° F. for a period not in excess of 12 hours in the presence of litharge as an alcoholysis catalyst until alcoholysis has taken place.

4. An air-drying surface-coating composition comprising the partial alcoholysis product of polymethyl methacrylate with a drying oil diglyceride, and produced according to the process of claim 2.

DONALD HELMSLEY HEWITT.
FRANK ARMITAGE.

REFERENCES CITED

The following references are of record in the file of this patent:

UNITED STATES PATENTS

| Number | Name | Date |
| --- | --- | --- |
| 2,099,047 | Bradshaw | Nov. 16, 1937 |
| 2,109,877 | Barrett (1) | Mar. 1, 1938 |
| 2,129,722 | Woodhouse | Sept. 13, 1938 |
| 2,160,532 | Barrett (2) | May 30, 1939 |
| 2,345,126 | Ireland | Mar. 28, 1944 |